(12) United States Patent
Meissner et al.

(10) Patent No.: US 7,905,457 B2
(45) Date of Patent: Mar. 15, 2011

(54) INTERLOCKING BRACKETS FOR FILTER CAPSULES AND METHOD OF FORMING THE SAME

(75) Inventors: Christopher A. Meissner, Camarillo, CA (US); Keith D. Trottier, Moorpark, CA (US); Charles N. Carter, Oxnard, CA (US)

(73) Assignee: Meissner Filtration Products, Inc., Camarillo, CA (US)

( * ) Notice: Subject to any disclaimer, the term of this patent is extended or adjusted under 35 U.S.C. 154(b) by 1 day.

(21) Appl. No.: 12/419,856

(22) Filed: Apr. 7, 2009

(65) Prior Publication Data
US 2010/0072340 A1 Mar. 25, 2010

Related U.S. Application Data

(60) Provisional application No. 61/099,506, filed on Sep. 23, 2008.

(51) Int. Cl.
*F16M 11/00* (2006.01)
(52) U.S. Cl. ............................. 248/201; 248/315
(58) Field of Classification Search .................. 248/315, 248/201, 65, 74.1
See application file for complete search history.

(56) References Cited

U.S. PATENT DOCUMENTS

| | | | | |
|---|---|---|---|---|
| 5,344,112 A * | 9/1994 | Peterson et al. | | 248/313 |
| 7,472,870 B2 * | 1/2009 | Zagorski et al. | | 248/65 |
| 7,546,986 B2 * | 6/2009 | Kim | | 248/62 |
| 2005/0253024 A1 * | 11/2005 | Zagorski et al. | | 248/65 |

FOREIGN PATENT DOCUMENTS

| | | | | |
|---|---|---|---|---|
| DE | 3824197 A1 * | 1/1990 | | 248/74.1 |
| JP | 04065205 | * 10/1993 | | 248/65 |

* cited by examiner

*Primary Examiner* — Ramon O Ramirez
(74) *Attorney, Agent, or Firm* — Christie, Parker & Hale, LLP

(57) ABSTRACT

Interlocking brackets for filter capsules are provided. According to one embodiment, a filter capsule bracket includes a first bracket portion including a first side having a concave surface and at least one plug; and a second bracket portion including a first side having a concave surface corresponding to the concave surface of the first bracket portion and at least one socket for receiving the at least one plug of the first side of the first bracket, wherein the concave surfaces of the first and second bracket portions are configured to retain a filter capsule when the at least one plug of the first side of the first bracket portion is received by the at least one socket of the first side of the second bracket portion.

24 Claims, 10 Drawing Sheets

INTERLOCKING BRACKETS FOR FILTER CAPSULES AND METHOD OF FORMING THE SAME

CROSS-REFERENCE TO RELATED APPLICATION

This application is based upon and claims priority on U.S. Provisional Application Ser. No. 61/099,506, filed on Sep. 23, 2008, the contents of which are fully incorporated herein by reference.

FIELD OF THE INVENTION

The present invention relates generally to interlocking brackets, and more particularly to interlocking brackets for retaining filter capsules.

BACKGROUND OF THE INVENTION

Filter capsules are known and utilized for filtering and/or purifying liquids and biologicals, such as in the pharmaceuticals industry. Filter capsules have an inlet and an outlet, which may include piping or similar fittings. The inlet and outlet of a filter capsule may each be near the top of the filter capsule, and the filter capsule, itself, may also have a cylindrical shape designed to operate while placed upright on one end. Further, the filter capsule may have a length that is substantially greater than its diameter, such that when the cylindrical filter capsule is set upright on an end during use, it may be unstable. That is, the filter capsule may tend to fall over onto its side. Moreover, for many filtering and/or purifying applications, one filter capsule may not provide sufficient filtering capacity to achieve a desired efficiency, and it may be difficult to maintain multiple filters in position relative to one another.

SUMMARY OF THE INVENTION

Aspects of embodiments of the present invention are directed to a bracket or system of brackets for retaining filter capsules such as filter capsules in an upright and stationary position and in predetermined relative positions for manifolding multiple filter capsules, such as in series or parallel configurations for increased filter capacity. Embodiments of filter capsule brackets of the present invention may include permanent locking tabs for permanently joining individual filter assemblies together. Further, locking bracket assemblies may permit filters of the same or different type to be joined together such that a chain of prefilters may be connected to a final filter. Embodiments of filter capsule brackets of the present invention may include a plastic assembly with locking tabs that snap together to firmly fit circumferentially around a filter capsule. The locking tabs may have a raised detent that snaps into a mating receptacle. Further, the locking tabs may have a tapered leading edge for forcing the tab down to snap into the mating receptacle.

Another aspect of embodiments of filter capsule brackets of the present invention is that the tabs, once snapped together, do not easily come apart and, further, do not require adhesives or welding to be joined together. Filter capsule brackets of the present invention may include two mating halves or portions, and may further include additional locking tabs for joining adjacent brackets together on any of the exposed sides. Yet another aspect of embodiments of filter capsule brackets of the present invention is that the brackets allow the filter capsules to be rotated in order to be connected in series or parallel. Further, filters connected in series may be held by brackets having additional brackets connected in parallel. Still another aspect of embodiments of filter capsule brackets of the present invention is the ability to pre-assemble and ship the filter capsules and brackets, as well as to later mount the assembly, so as to reduce or prevent excessive stress that may cause breakage.

According to an embodiment of the present invention, a capsule bracket includes: a first bracket portion including a first side having a concave surface and at least one plug; and a second bracket portion including a first side having a concave surface corresponding to the concave surface of the first bracket portion and at least one socket for receiving the at least one plug of the first side of the first bracket, wherein the concave surfaces of the first and second bracket portions are configured to retain a capsule when the at least one plug of the first side of the first bracket portion is received by the at least one socket of the first side of the second bracket portion.

In one embodiment, the at least one socket of the first side of the second bracket portion is configured to receive the at least one plug of the first side of the first bracket portion in a permanent interlocking manner.

In one embodiment, the concave surface of at least one of the first and second bracket portions includes a rib configured to be received in a groove on an outer surface of the filter capsule.

In one embodiment, the concave surfaces of the first and second bracket portions are substantially semi-circular.

In one embodiment, the at least one plug includes a first tab having a first angled face, and the at least one socket includes a first slot for receiving the first tab.

In one embodiment, the at least one plug further includes a second tab having a second angled face, and the at least one socket further includes a second slot for receiving the second tab.

According to another embodiment of the present invention, a pair of interlocking brackets is configured to retain two filter capsules in a predetermined position relative to each other, each of the interlocking brackets including: a first bracket portion including a first side having a concave surface and a plug; and a second bracket portion including a first side having a concave surface corresponding to the concave surface of the first bracket portion and a socket for receiving the plug of the first side of the first bracket, the concave surfaces of the first and second bracket portions configured to retain a filter capsule when the plug of the first side of the first bracket portion is received by the socket of the first side of the second bracket portion, wherein one of the interlocking brackets includes a perimeter plug on another side of one of the bracket portions of the one interlocking bracket, and the other of the interlocking brackets includes a perimeter socket on another side of one of the bracket portions of the other interlocking bracket, the perimeter socket configured to receive the perimeter plug of the one interlocking bracket.

According to yet another embodiment of the present invention, a system of manifolded filter capsules includes a plurality of interlocking brackets for retaining a plurality of filter capsules to provide increased filter capacity, each of the plurality of interlocking brackets including: a first bracket portion including a first side having a concave surface and a plug; a second side having a perimeter plug; a third side opposite the first side and having a perimeter socket; and a fourth side opposite the second side and having a perimeter socket; a second bracket portion including a first side having a concave surface corresponding to the concave surface of the first bracket portion and a socket for receiving the plug of the first side of the first bracket; a second side having a perimeter plug;

a third side opposite the first side and having a perimeter plug; and a fourth side opposite the second side and having a perimeter socket, wherein the concave surfaces of the first and second bracket portions are configured to retain a filter capsule when the plug of the first side of the first bracket portion is received by the socket of the first side of the second bracket portion, and wherein each of the perimeter sockets is configured to receive a perimeter plug of another of the plurality of interlocking brackets.

In another exemplary embodiment, a capsule bracket is provided including a first bracket portion including a first side having a concave surface, a first plug and a first socket, a second side opposite the first side having a second plug and a second socket, a third side between the first and second sides having a third plug, and a fourth side between the first and second sides and opposite the third side having a third socket. The bracket also includes a second bracket portion having first side having a concave surface, a first plug and a first socket, a second side opposite the first side having a second plug and a second socket, a third side between the first and second sides having a third plug, and a fourth side between the first and second sides and opposite the third side having a third socket. The second bracket portion is identical to the first bracket portion. The first plug of the first bracket portion is received in the first socket of the second bracket portion and the first plug of the second bracket portion is received in the first socket of the first bracket portion coupling the first and second bracket portions together to define the bracket. The concave surfaces of the first and second bracket portions are configured to retain a capsule when the first a second bracket portions are coupled together. In a further exemplary embodiment, a rib may extend from the concave surface of each bracket portion.

In yet a further exemplary embodiment a bracket system for supporting multiple capsules is provided. Each capsule is supported by a bracket formed from identical bracket portions. Each bracket is connected to another bracket. Each bracket portion includes a first side having a concave surface, a first plug and a first socket, a second side opposite the first side having a second plug and a second socket, a third side between the first and second sides having a third plug, and a fourth side between the first and second sides and opposite the third side having a third socket. A first plug of a first bracket portion is receivable within a first socket of a second bracket portion and a first plug of a second bracket portion is receivable within a first socket of the first bracket portion to define a bracket for supporting a capsule between concave surfaces of the first and second bracket portions. A second plug of a second side of the first bracket portion is receivable within a second socket of a second side of a third bracket portion and a second plug of the second side of the third bracket portion is receivable in a second socket of a second side of the second bracket portion. A third plug of a third side of the first bracket portion is receivable in a third socket on a fourth side of a third bracket portion, and a third plug on a fourth side of a fourth bracket portion is receivable within in a third socket on a fourth side of the first bracket portion. In another exemplary embodiment, each plug includes a tab extending transversely from the plug and each socket includes a slot for receiving such tab for interconnecting the plug to such socket. In yet a further exemplary embodiment, each plug includes another tab extending transversely from the other plug and opposite the tab, and each socket includes another slot opposite the other slot for receiving the another tab for interconnecting the plug to the socket. In yet a further exemplary embodiment each bracket portion may include a rib extending along its concave surface.

In another exemplary embodiment a bracket portion is provided for supporting a capsule. The bracket portion includes a first side having a concave surface, a first plug and a first socket, a second side opposite the first side having a second plug and a second socket, a third side between the first and second sides having a third plug, and a fourth side between the first and second sides and opposite the third side having a third socket, wherein the bracket portion is coupleable with another bracket portion for forming a bracket for supporting the capsule with the concave surface. In yet a further exemplary embodiment, the bracket portion includes a rib extending along the concave surface.

Other features and advantages of the present invention will become apparent from the following detailed description, taken in conjunction with the accompanying drawings which illustrate, by way of example, the features of the present invention.

DETAILED DESCRIPTION

In the following detailed description, certain exemplary embodiments of the present invention are shown and described by way of illustration. As those skilled in the art would recognize, the described exemplary embodiments may be modified in various ways without departing from the spirit or scope of the present invention. Accordingly, the drawings and description are to be regarded as illustrative in nature, rather than restrictive. Further, terms such as "upper," "lower," "left," "right," "top," "bottom," and other similar terms are used for illustrative purposes in the description to denote the relative and not the exact position of items and are not to be regarded as restrictive; rather, it should be understood that the present invention is not limited to any spatial orientation.

As shown in FIGS. 1-18, embodiments of the present invention are directed to a bracket or system of brackets for retaining filter capsules in an upright and stationary position and in positions relative to each other suitable for manifolding multiple filter capsules, such as in series or parallel configurations for increased filter capacity. Embodiments of the filter capsule brackets have two portions configured to interlock with each other, such as by a plug and socket type connection or other suitable device. Embodiments of the filter capsule brackets include a concave surface on each of the two bracket portions, such as a semicircular surface having substantially the same size and shape as an outer surface of a cylindrical filter capsule, so as to surround and hold in place the filter capsule when the two bracket portions are interlocked. Further, embodiments of filter capsules brackets are configured to interlock with other filter capsule brackets so as to retain multiple filter capsules in position relative to each other for connecting the filter capsules in series or in parallel.

Figures 1, 3:
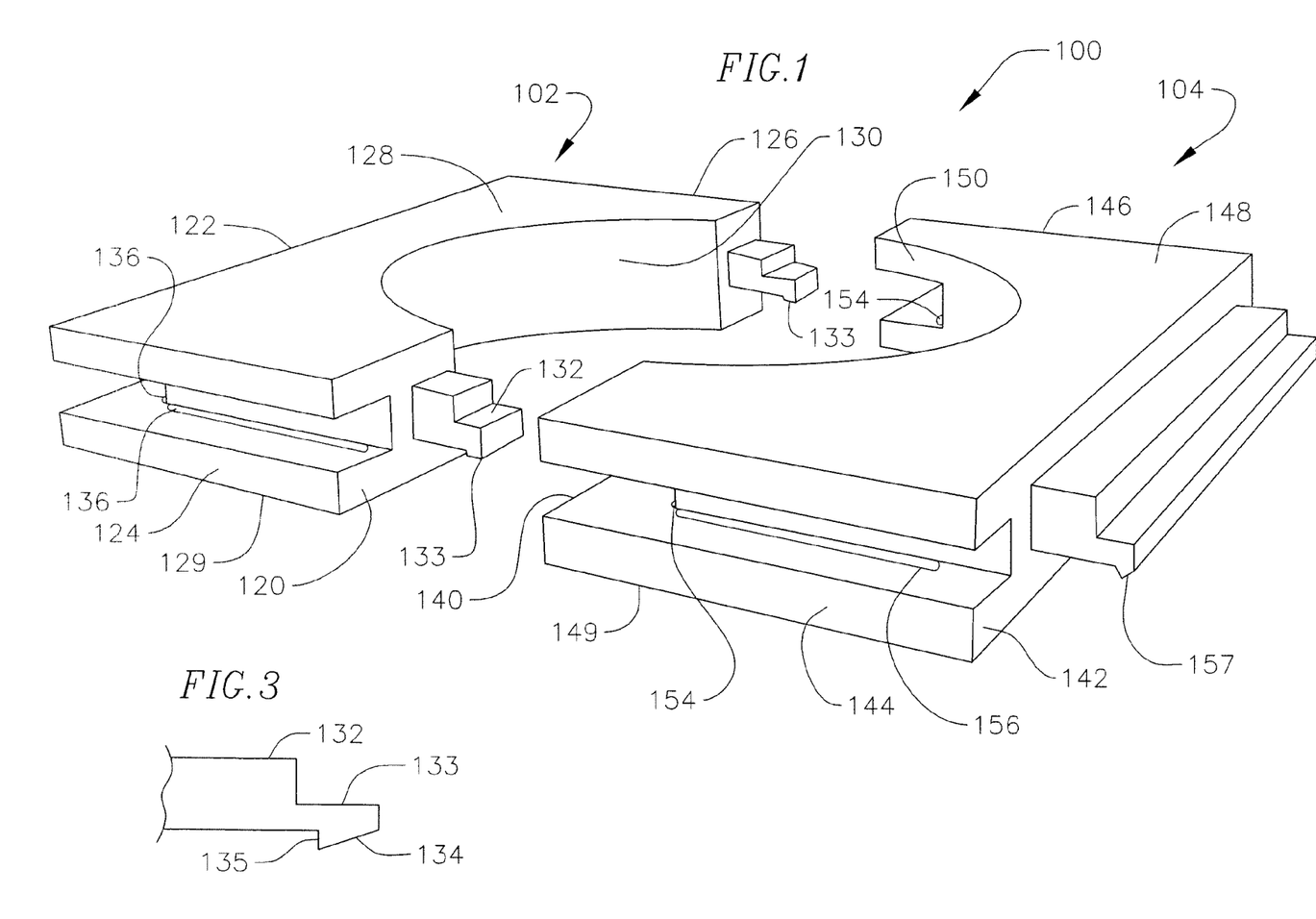
FIG. 1 is a perspective view of a filter capsule bracket according to an embodiment of the present invention.
FIG. 3 is a front detail view of the filter capsule bracket of FIG. 1.
Figure 2:
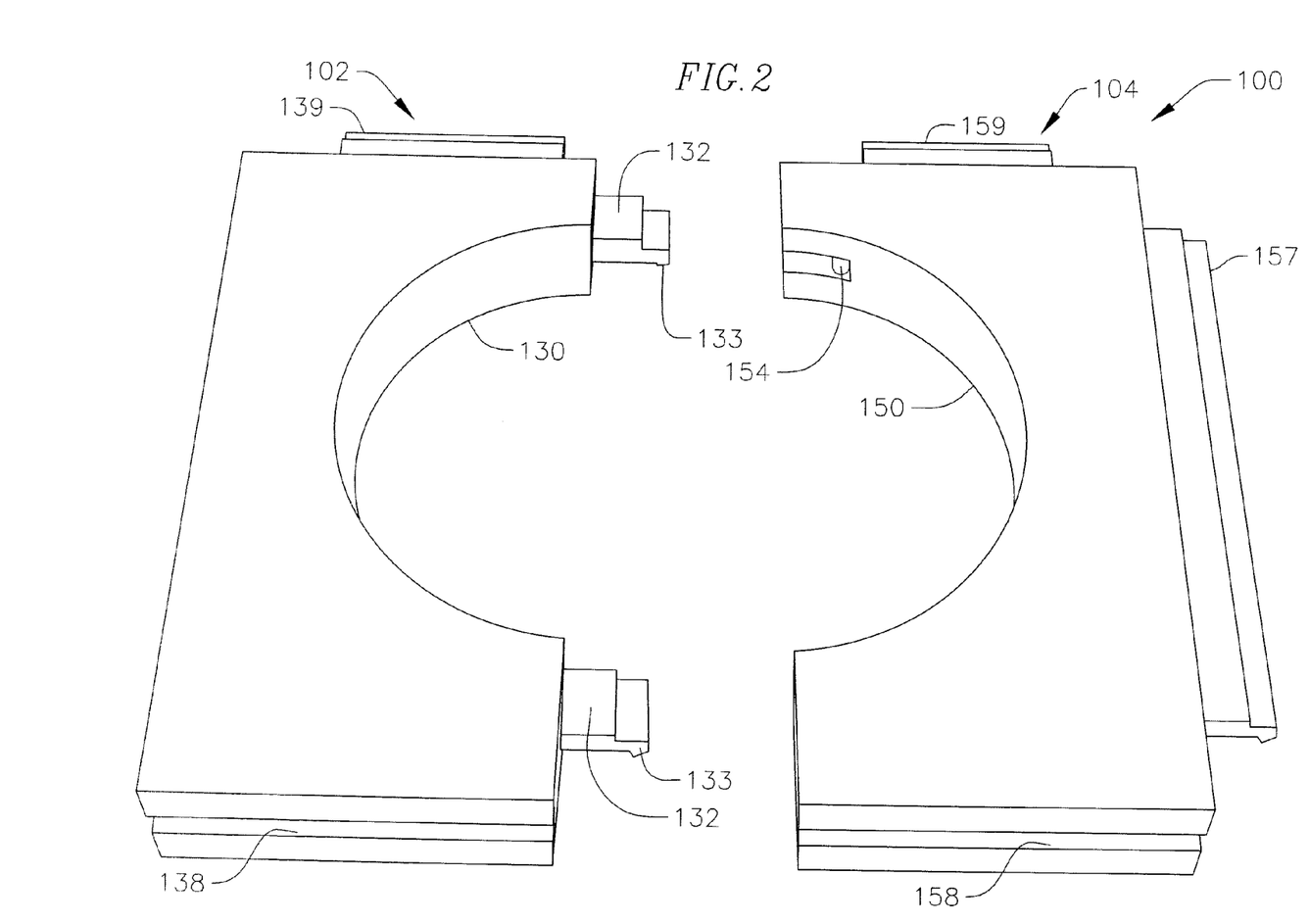
FIG. 2 is a top perspective view of the filter capsule bracket of FIG. 1.
Figure 4:
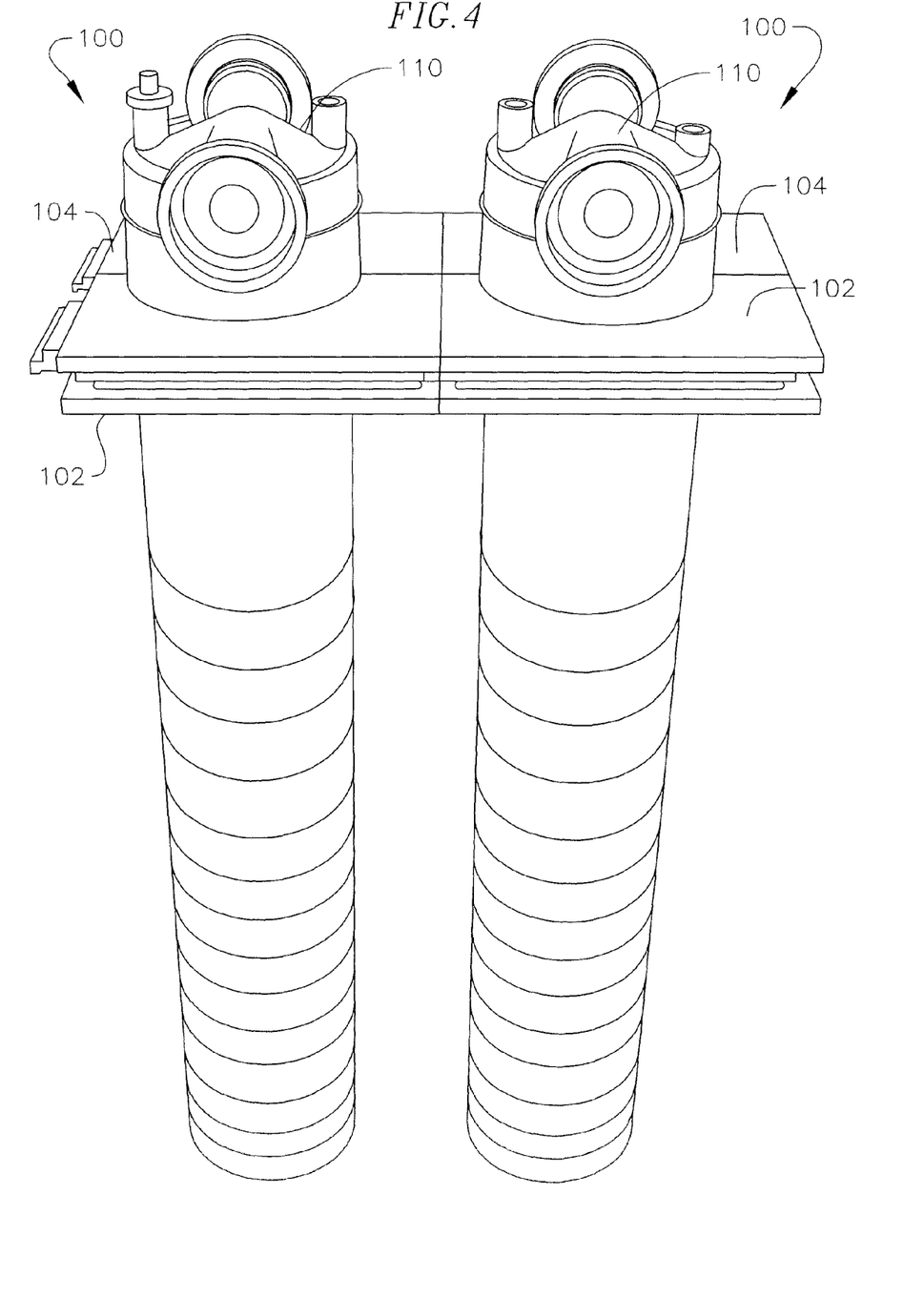
FIG. 4 is a front perspective view of two filter capsule brackets according to an embodiment of the present invention, the two filter capsule brackets interlocked and retaining two filter capsules in a parallel configuration.
Figure 5:
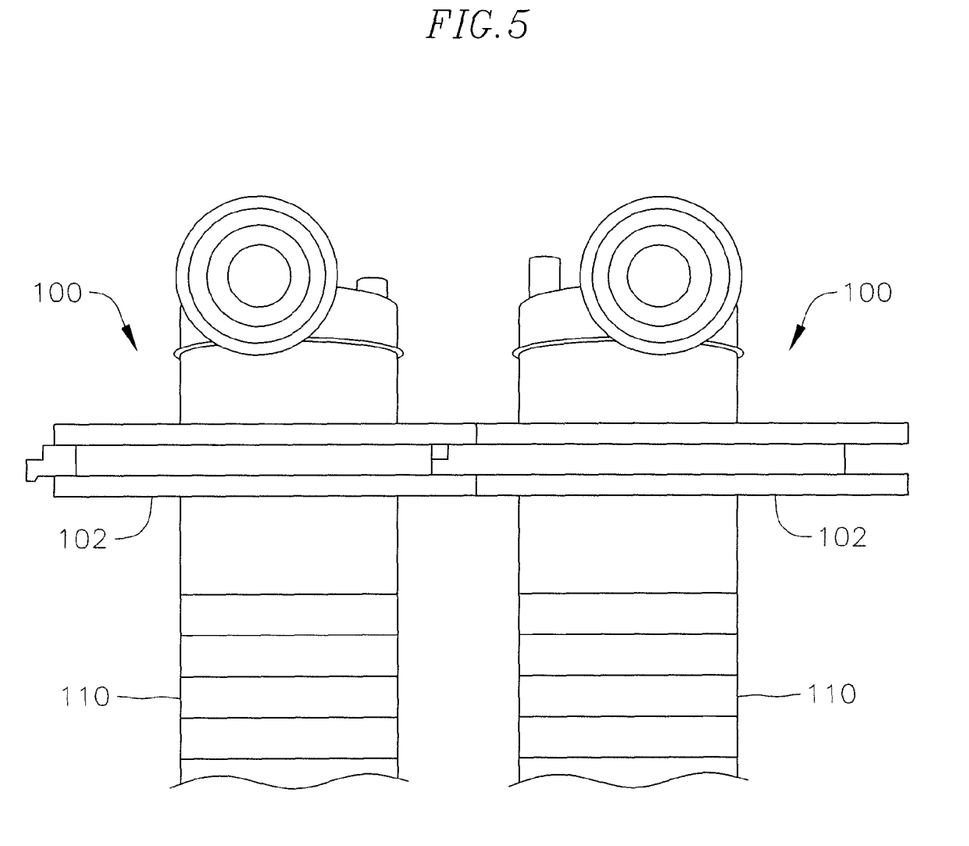
FIG. 5 is a front view of the two filter capsule brackets of FIG. 4.
Figure 6:
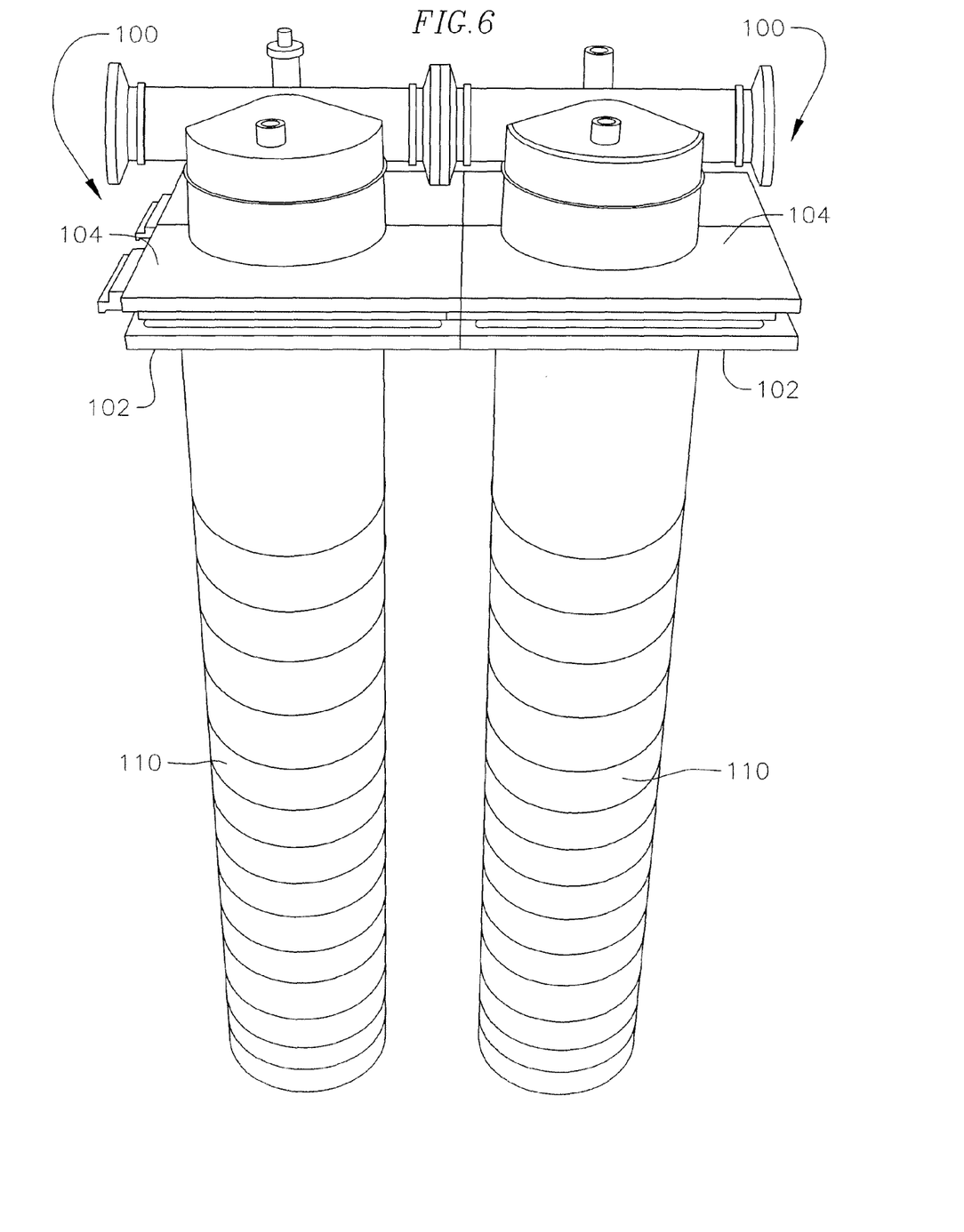
FIG. 6 is a front perspective view of two filter capsule brackets according to an embodiment of the present invention, the two filter capsule brackets interlocked and retaining two filter capsules in a series configuration.

With reference to FIGS. 1 and 2, a filter capsule bracket 100 has a first bracket portion 102 (e.g., a left bracket portion) and a second bracket portion 104 (e.g., a right bracket portion). The first and second bracket portions 102, 104 are shown not joined together in FIGS. 1 and 2 but are configured to be joined together and are depicted in FIGS. 4-6 as joined together and retaining a filter capsule 110 there-between. In one embodiment, the first and second bracket portions 102, 104 may be permanently joined together, such as with an interlocking plug and socket feature. However, in other embodiments, the first and second bracket portions 102, 104 may be disjoined after having been joined. Additionally, in FIGS. 4-6, two filter capsule brackets 100 are joined together such that two filter capsules 110 are held in a predetermined relative position to each other. Moreover, any desired number of filter capsule brackets 100 may be joined to retain a desired quantity of filter capsules 110. The filter capsules 110 may be retained to be connected in a parallel configuration (see FIGS. 4 and 5), in a series configuration (see FIG. 6), or a combination thereof.

The first and second bracket portions 102, 104, in one embodiment, each have a substantially rectangular shape, such that when joined together, the filter capsule bracket 100 has a substantially square or rectangular shape. Further, the first and second bracket portions 102, 104 may be formed of polypropylene in one embodiment, but alternatively may be formed of any other suitable plastic or other material, or a combination thereof. The first and second bracket portions 102, 104 may be formed by machining, molding, casting, or any other suitable technique, or combination thereof.

With reference to FIGS. 1 and 2, the first bracket portion 102 includes a first side 120, a second side 122 opposite and spaced from the first side 120, a third side 124 extending between the first side 120 and the second side 122, and a fourth side 126 spaced from the third side 124 and also extending between the first side 120 and the second side 122. The first bracket portion 102 also has a top surface 128 and a bottom surface 129.

The first side 120 of the first bracket portion 102 includes a concave surface 130. The concave surface 130 has a shape configured for holding a filter capsule. As such, in the embodiment shown, the concave surface 130 has a substantially semi-circular shape for surrounding approximately one half of a substantially cylindrical filter capsule. Alternatively, the concave surface 130 may have any other suitable configuration for holding a filter capsule having a different shape.

The first side 120 of the first bracket portion 102 also includes two plugs 132, one on each side of the concave surface 130. Each of the plugs 132 has a protruding tab 133 extending away from a lower portion of the plug 132. As shown in FIG. 3, the tab 133 has an angled surface 134 facing the bottom surface 129 and sloping from an outermost end of the tab 133 toward the bottom surface 129. The tab 133 is configured to be received in a slot 154 on the bottom surface 129, the angled surface 134 providing ease of insertion. Also, there is a flat 135 behind the angled surface 134 configured to abut an inside surface of the slot 154 for capturing the tab 133 within the slot 154. Alternatively, the tab 133 may extend from an upper portion of the plug 132 and be configured for being received in a slot on the top surface 128.

With further reference to FIGS. 1 and 2, the second bracket portion 104 includes a first side 140, a second side 142 opposite and spaced from the first side 140, a third side 144 extending between the first side 140 and the second side 142, and a fourth side 146 spaced from the third side 144 and also extending between the first side 140 and the second side 142. The second bracket portion 104 also has a top surface 148 and a bottom surface 149. The second bracket portion 104 also includes a concave surface 150 on the first side 140 similar to, and in one embodiment, substantially a mirror image of, the concave surface 130 of the first bracket portion 102.

The first side 140 of the second bracket portion 104 has two sockets 152 corresponding to and configured to receive the two plugs 132 of the first bracket portion 102. The sockets 152 may be channels formed in the first side 140. The sockets 152 each include the slot 154 having a depth extending toward and/or through the bottom surface 149 (or alternatively the top surface 148 where the tab 133 extends from an upper surface of the plug 132). The slots 154 have a length and depth such that the slots 154 are configured to receive a portion of the tabs 133 (e.g., the angled surface 134 and flat 135 of the tabs 133 described above). In one embodiment, the tabs 133 are configured to be received in the slots 154 in a "snap-in" or interlocking manner.

With further reference to FIGS. 1 and 2, the second, third, and fourth sides 122, 124, 126 of the first bracket portion 102, as well as the second, third, and fourth sides 142, 144, 146 of the second bracket portion 104, have perimeter plugs and perimeter sockets configured to mate with perimeter sockets and perimeter plugs, respectively, of adjacent filter capsule brackets 100 so that two or more filter capsule brackets 100 may be connected to each other (see FIGS. 4-6). The structures of the perimeter plugs and perimeter sockets are similar to those of the plugs 132 and sockets 152 described above. That is, each of the perimeter plugs has a tab extending away from the perimeter plug, and the tab has an angled surface and a flat, similar to the tabs 133 described above. Also, each of the perimeter sockets includes a perimeter slot 136, 156, similar to the slots 154, for receiving a tab of a perimeter plug.

In one embodiment, as shown in FIGS. 1 and 2, the second side 122 of the first bracket portion 102 has a perimeter socket 137; the third side 124 of the first bracket portion 102 has a perimeter socket 138; and the fourth side 126 of the first bracket portion 102 has a perimeter plug 139. Additionally, in one embodiment, the second side 142 of the second bracket portion 104 has a perimeter plug 157; the third side 144 of the second bracket portion 104 has a perimeter socket 158; and the fourth side 146 of the second bracket portion 104 has a perimeter plug 159. Of course, alternative embodiments may include perimeter sockets, perimeter plugs, or various combinations thereof on the second, third, and fourth sides of the first and second bracket portions 102, 104 in configurations other than the embodiment described above and shown in FIGS. 1 and 2.

With reference to FIGS. 7-16, another embodiment of a filter capsule bracket may include a first bracket portion 202 and a second bracket portion 204. The first and second bracket portions 202, 204 are similar, respectively, to the first and second bracket portions 102, 104 discussed above with respect to the filter capsule bracket 100, and as such, are also configured to be joined together as two portions of a filter capsule bracket for retaining a filter capsule. A differing feature of the first and second bracket portions 202, 204 and the earlier described first and second bracket portions 102, 104 is the structure of the plug and socket for joining the first and second bracket portions 202, 204 together. As described in further detail below, the plug and socket structures of the first and second bracket portions 202, 204 are configured to provide a more permanent joinder of the first and second bracket portions 202, 204 to each other around a filter capsule, as well as to other first and second bracket portions 202, 204 at their perimeter.

Other features and aspects of the first and second bracket portions 202, 204 are similar to those of the first and second bracket portions 102, 104 described above. For example, the first and second bracket portions 202, 204 each may be substantially rectangular in one embodiment, such that when joined together, they form a substantially square or rectangular filter capsule bracket. Additionally, the first and second bracket portions 202, 204 may be formed of polypropylene in one embodiment, but alternatively may be formed of any other suitable plastic or other material, or a combination thereof. The first and second bracket portions 202, 204 may be formed by machining, molding, casting, or any other suitable technique, or combination thereof.

As described above with respect to the first and second bracket portions 102, 104, the first and second bracket portions 202, 204 are configured to be joined to each other to provide a filter capsule bracket for retaining a filter capsule between the two bracket portions. Further, the first and second bracket portions 202, 204 forming the filter capsule bracket are also configured to join to one or more other pairs of first and second bracket portions, such that two or more filter capsules can be connected in parallel (as shown in FIGS. 4 and 5) or in series (as shown in FIG. 6).

With reference to FIGS. 7-10, the first bracket portion 202 includes a first side 220, a second side 222 opposite and spaced from the first side 220, a third side 224 extending between the first side 220 and the second side 222, and a fourth side 226 spaced from the third side 224 and also extending between the first side 220 and the second side 222. The first bracket portion 202 also has a top surface 228 and a bottom surface 229. The first side 220 of the first bracket portion 202 includes a concave surface 230. The concave surface 230 has a shape configured for holding a filter capsule. Each of these features is similar to the corresponding feature of the first bracket portion 102 described above.

Figure 11:
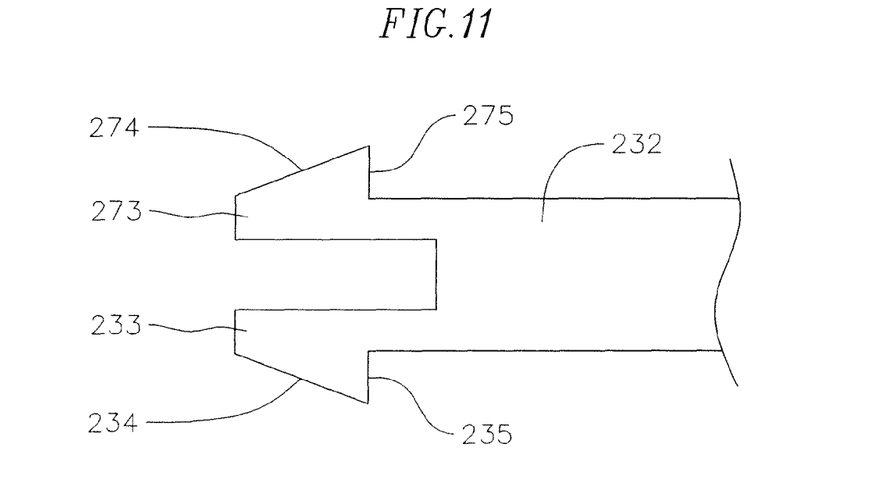
FIG. 11 is a left side detail view of the portion of the filter capsule bracket of FIG. 7.

With further reference to FIGS. 7-10, the first side 220 of the first bracket portion 202 also includes two plugs 232, one on each side of the concave surface 230. Whereas each of the plugs 132 of the first bracket portion 102 described above includes one protruding tab 133, each of the plugs 232 of the first bracket portion 202 has two protruding tabs, a tab 233 extending away from a lower portion of the plug 232, similar to the tab 133 described above, and also a tab 273 extending away from an upper portion of the plug 232. As shown in FIG. 11, the tab 233 extending from the lower portion of the plug 232 has an angled surface 234 facing the bottom surface 229 and sloping from an outermost end of the tab 233 toward the bottom surface 229. The tab 233 is configured to be received in a slot 254 on the bottom surface 229, the angled surface 234 providing ease of insertion. Also, there is a flat 235 behind the angled surface 234 configured to abut an inside surface of the slot 254 for capturing the tab 233 within the slot 254. Similarly, the tab 273 extending from the upper portion of the plug 232 has an angled surface 274 facing the top surface 228 and sloping from an outermost end of the tab 273 toward the top surface 228. The tab 273 is configured to be similarly received in a slot 284 on the top surface 228.

With reference to FIGS. 12-16, the second bracket portion 204 includes a first side 240, a second side 242 opposite and spaced from the first side 240, a third side 244 extending between the first side 240 and the second side 242, and a fourth side 246 spaced from the third side 244 and also extending between the first side 240 and the second side 242. The second bracket portion 204 also has a top surface 248 and a bottom surface 249. The second bracket portion 204 also includes a concave surface 250 on the first side 240 similar to, and in one embodiment, substantially a mirror image of, the concave surface 230 of the first bracket portion 202. Each of these features is also similar to the corresponding feature of the second bracket portion 104 described above.

The first side 240 of the second bracket portion 204 has two sockets 252 corresponding to and configured to receive the two plugs 232 of the first bracket portion 202. The sockets 252 may be channels formed in the first side 240. The sockets 252 each include the slots 254, 284, the slot 254 having a depth extending toward and/or through the bottom surface 249, and the slot 284 having a depth extending toward and/or through the top surface 248 where the tabs 233, 273 extend from the plug 232. The slots 254, 284 have a length and depth such that the slots 254, 284 are configured to receive a portion of the tabs 233, 273, respectively (e.g., the angled surfaces 234, 274 and flats 235, 275 of the tabs 233, 273 described above). In one embodiment, the tabs 233, 273 are configured to be received in the slots 254, 284 in a "snap-in" or interlocking manner. Because the first and second brackets portions 202, 204 have two tabs 233, 273 on each plug 232 for being received in two slots 254, 284, the first and second bracket portions 202, 204 may be joined in a more permanent manner than the first and second bracket portions 102, 104 described above, which have only one tab 133 on each plug 132 for being received in one of the slots 154. Because the first and second bracket portions 102, 104 have only one tab 133 on each plug 132, the first and second bracket portions 102, 104 may be more easily disjoined from each other, such as by rotating the two portions 102, 104 relative to each other about an axis extending in a direction of the length of the slot 154 until the flat of the tab 133 is clear of the slot 154. By contrast, the first and second bracket portions 202, 204 are restrained from substantially rotating relative to each other once joined together because of the two tabs 233, 273 in the slots 254, 284.

The second, third, and fourth sides 222, 224, 226 of the first bracket portion 202 (see FIGS. 7-10), as well as the second, third, and fourth sides 242, 244, 246 of the second bracket portion 204 (see FIGS. 12-16), may have perimeter plugs and perimeter sockets, similar to those of the first and second bracket portions 102, 104 described above, configured to mate with perimeter sockets and perimeter plugs, respectively, of adjacent filter capsule brackets so that two or more filter capsule brackets may be connected to each other. The structures of the perimeter plugs and perimeter sockets are similar to those of the plugs 232 and sockets 252 described above. That is, each of the perimeter plugs has an upper tab and a lower tab extending away from the perimeter plug, and the tabs have angled surfaces and flats, similar to the tabs 233, 273 described above. Also, each of the perimeter sockets includes a perimeter slot 236, 256 on each of the top surface 248 and the bottom surface 249, similar to the slots 254, 284 for receiving the upper and lower tabs, respectively, of a perimeter plug.

In one embodiment, as shown in FIGS. 7-10, the second side 222 of the first bracket portion 202 has a perimeter socket 237; the third side 224 of the first bracket portion 202 has a perimeter socket 238; and the fourth side 226 of the first bracket portion 202 has a perimeter plug 239. Additionally, in one embodiment, as shown in FIGS. 12-16, the second side 242 of the second bracket portion 204 has a perimeter plug 257; the third side 244 of the second bracket portion 204 has a perimeter socket 258; and the fourth side 246 of the second bracket portion 204 has a perimeter plug 259.

Of course, the plugs and sockets of the first and second bracket portions 202, 204 may be varied in number and location. This is also true regarding the first and second bracket portions 102, 104 described above. For example, in an alternative embodiment, the plugs 232 may be located on the second bracket portion 204, and the sockets 252 may be located on the first bracket portion 202. In another alternative embodiment, there may be one or more of each of a plug and a socket located on each of the first and second bracket portions 202, 204. Similar various embodiments of plugs and sockets are also possible for the perimeter plugs and sockets without departing from the scope of the invention. For example, each of the first or second bracket portions 202, 204 may have any suitable combination of perimeter plugs and perimeter sockets at the various sides, such that a group of filter capsule brackets may be connected together to form a manifold.

Figure 7:
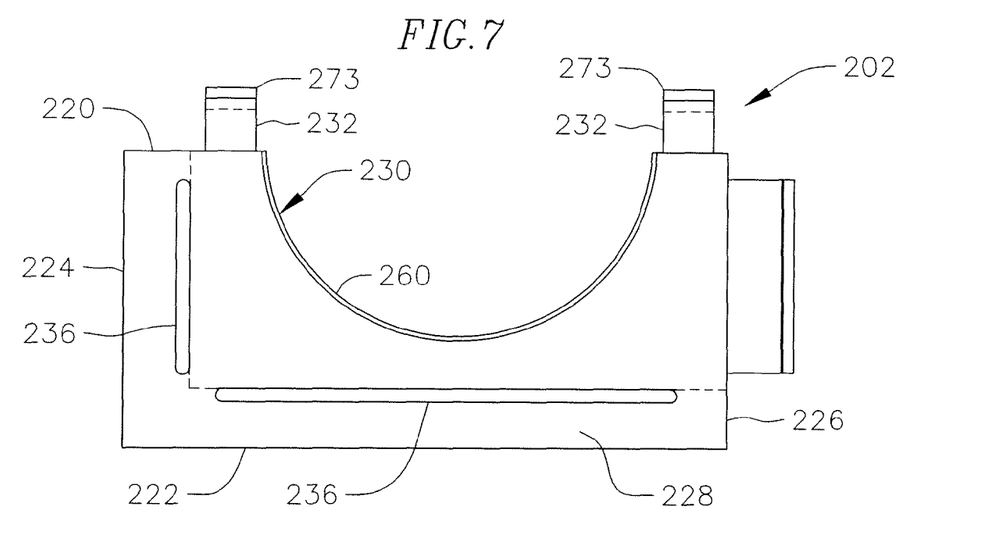
FIG. 7 is a top view of a portion of a filter capsule bracket according to an embodiment of the present invention.
Figure 8:
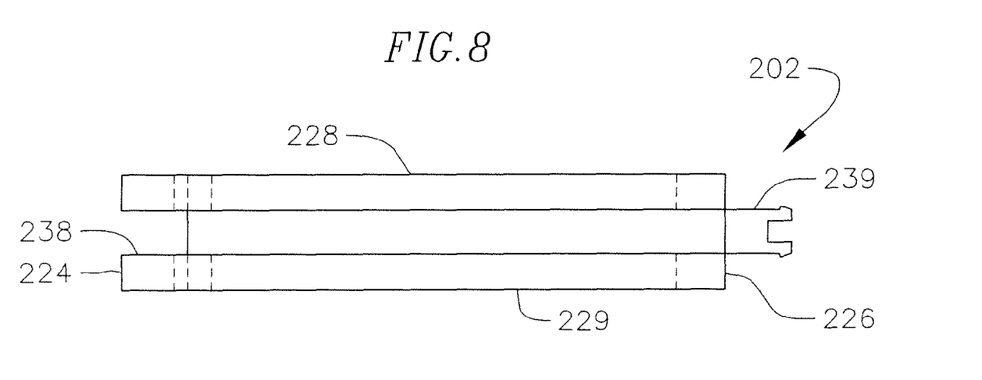
FIG. 8 is a front view of the portion of the filter capsule bracket of FIG. 7.
Figure 9:
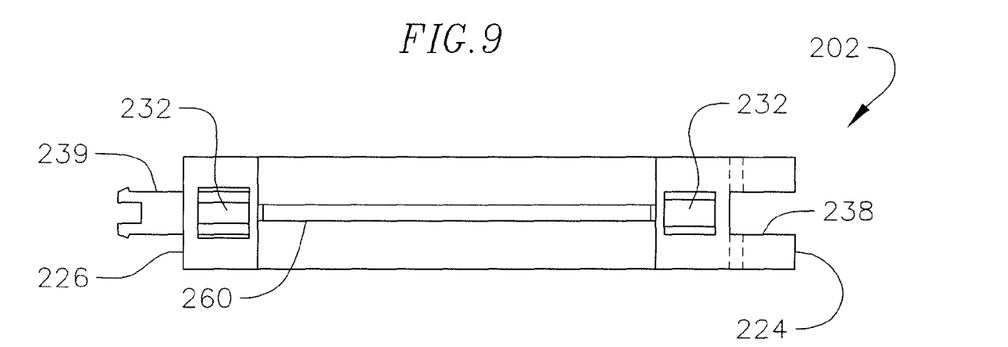
FIG. 9 is a rear view of the portion of the filter capsule bracket of FIG. 7.
Figure 10:
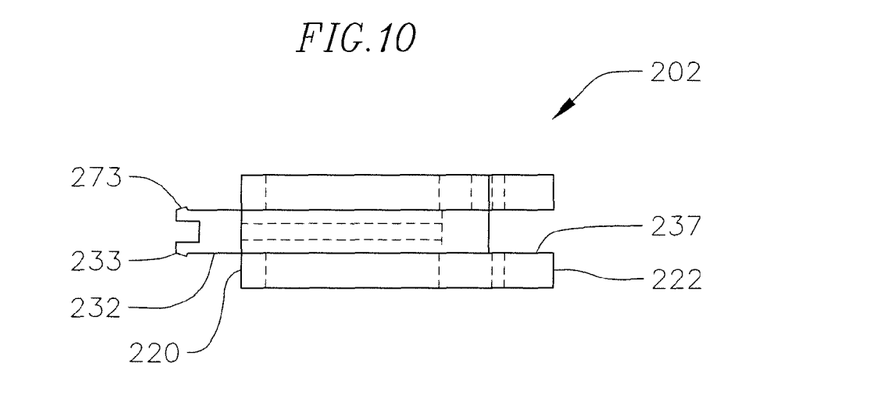
FIG. 10 is a left side view of the portion of the filter capsule bracket of FIG. 7.
Figure 12:
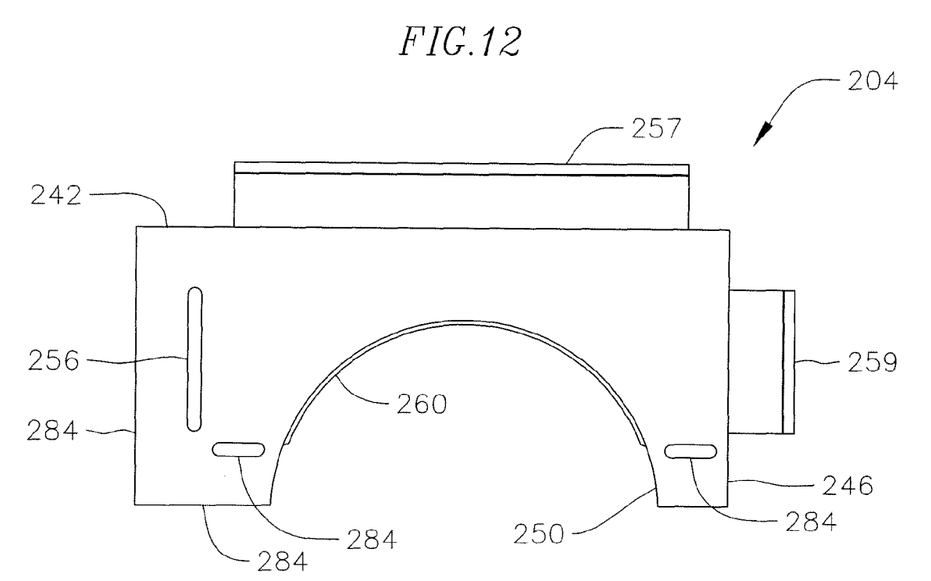
FIG. 12 is a top view of another portion of the filter capsule bracket according to an embodiment of the present invention.
Figure 13:
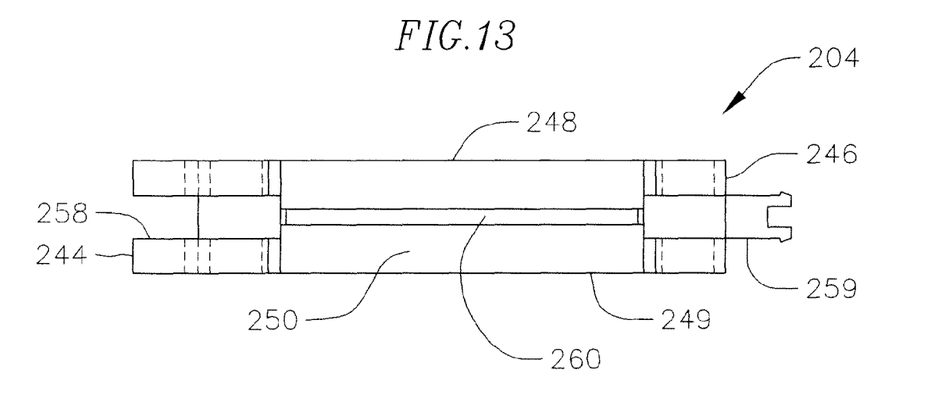
FIG. 13 is a front view of the portion of the filter capsule bracket of FIG. 12.
Figure 14:
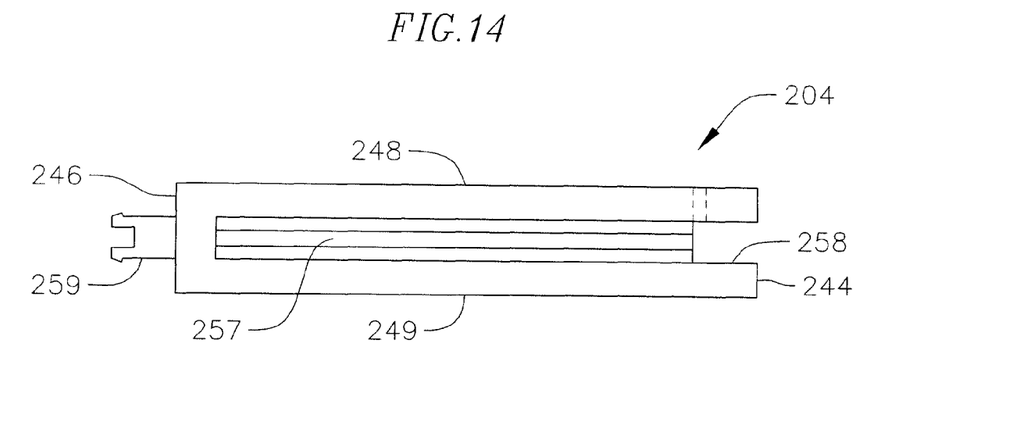
FIG. 14 is a rear view of the portion of the filter capsule bracket of FIG. 12.
Figure 15:
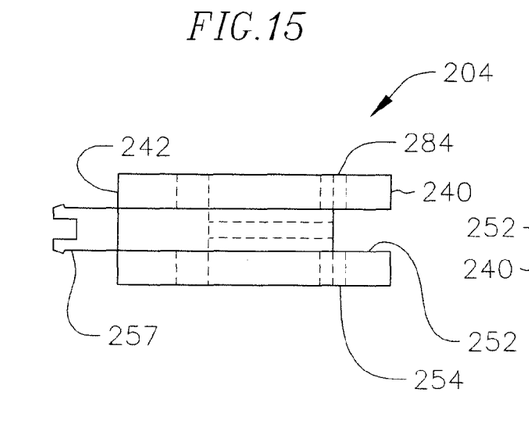
FIG. 15 is a left side view of the portion of the filter capsule bracket of FIG. 12.
Figure 16:
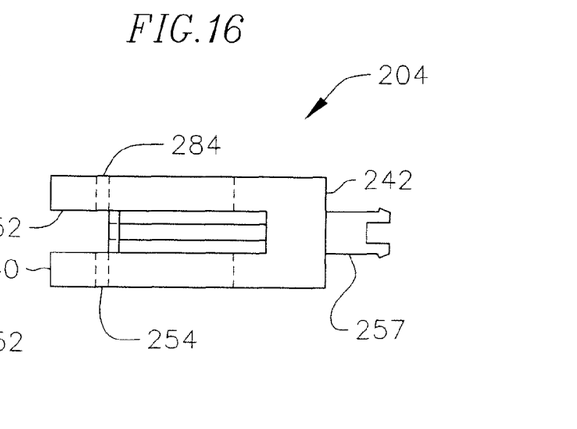
FIG. 16 is a right side view of the portion of the filter capsule bracket of FIG. 12.
Figure 17:
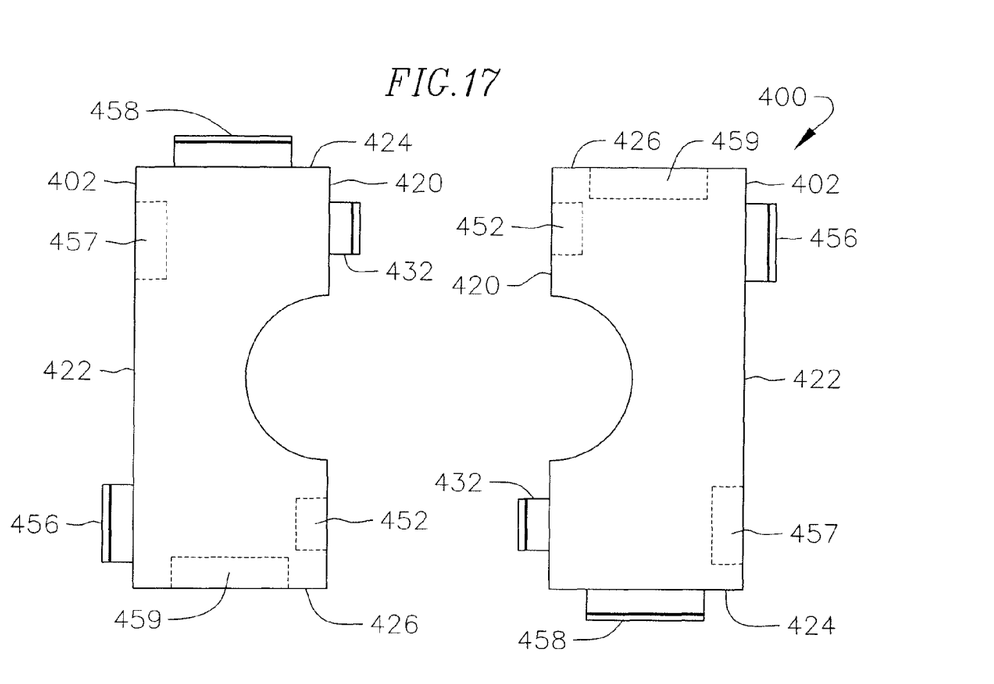
FIG. 17 is a top schematic view of a portion of a filter capsule bracket according to another embodiment of the present invention.

With further reference to FIGS. 7 and 12, one or both of the first and second bracket portions 202, 204 may include a rib 260 protruding from the concave surfaces 230, 250. The ribs 260 are configured to seat within, or be otherwise coupled to, a groove on an outer surface of a filter capsule. As such, the ribs 260 deter or prevent lateral movement of the filter capsule within the filter capsule bracket 200. The ribs 260, in one embodiment, may allow rotational movement of the filter capsule, such as to rotate the orientation of a filter capsule inlet and/or outlet. Although shown located substantially at a midplane of the thickness of each of the first and second bracket portions 202, 204 (see FIGS. 9 and 13), the ribs 260 may be located at any height on the concave surfaces 230, 250. Moreover, each of the concave surfaces 230, 250 may include more than one rib 260. Alternatively, rather than a rib/groove mating configuration, the filter capsule may be held firmly (while still possibly allowing rotational movement) within the filter capsule bracket via a friction fit or other suitable holding device. For example, in one alternative embodiment, a filter capsule bracket may have a rib (e.g., a narrow and/or malleable rib) configured to fit snugly against an outer surface of a filter capsule that does not have a groove. Further, the first and second bracket portions 102, 104 described above may include one or more ribs, such as ribs 260, or alternative devices for retaining a filter capsule against lateral movement, such as a friction fit.

According to another embodiment, a filter capsule bracket may include two filter capsule bracket portions having the same configuration in order to provide reduced cost and simplicity of assembly. For example, with reference to FIG. 17, a filter capsule bracket 400 includes two filter bracket portions 402 having the same configuration. As shown, a first side 420 of the filter capsule bracket portion includes each of a plug 432 and a socket 452, wherein the socket 452 is configured to receive a plug 432 of the first side 420 of another filter bracket portion 402. Further, a second side 422 of the filter bracket portion 402 opposite the first side 420 may include each of a perimeter plug 456 and a perimeter socket 457, the perimeter socket 457 configured to receive a perimeter plug 456 of the second side 422 of yet another filter bracket portion 402. The filter bracket portion 402 also has a third side 424, which may include a perimeter plug 458, and a fourth side 426, which may include a perimeter socket 459 configured to receive a perimeter plug 458 of the third side 424 of still another filter bracket portion 402.

In use, one or more filter capsule brackets 100, 200 may be used to retain filter capsules in position, such as having a relative, predetermined spacing from each other. The position and spacing of the filter capsules relative to each other is governed by the filter capsule brackets 100, 200. That is, each filter capsule bracket 100, 200 is configured to retain one filter capsule, and a plurality of filter capsule brackets may be utilized to retain a plurality of filter capsules in a predetermined position, such as for interconnecting a series of filter capsules. In use, the filter capsule brackets 100, 200 are positioned with the concave surfaces 130, 230 of the first bracket portion 102, 202 and the concave surfaces 150, 250 of the second bracket portion 104, 204 facing each other with a filter capsule there-between, such that the concave surfaces circumferentially surround and hold the filter capsule. The first side 120, 220 of the first bracket portion 102, 202 and the first side 140, 240 of the second bracket portion 104, 204 face each other and are moved closer together until the plug(s) 132, 232 are received by the socket(s) 152, 252. In one embodiment, the first sides 120, 220 and 140, 240 may abut each other when the first and second bracket portions 102, 202 and 104, 204 are interlocked or otherwise joined together. The filter capsule brackets 100, 200 may be positioned near a filter capsule inlet and outlet (e.g., the top of the filter capsule) in order to provide support against forces on the inlet and outlet interconnections.

Further, one or more additional sets of filter capsule brackets may be utilized to retain each of the filter capsules. That is, a second set of filter capsule brackets may be located at and utilized to retain the filter capsules near the bases, in addition to, or as a substitute for, the brackets near the tops of the filter capsules. Additionally, one or more additional sets of brackets may be placed anywhere between the tops and bases of the filter capsules.

Figure 18:
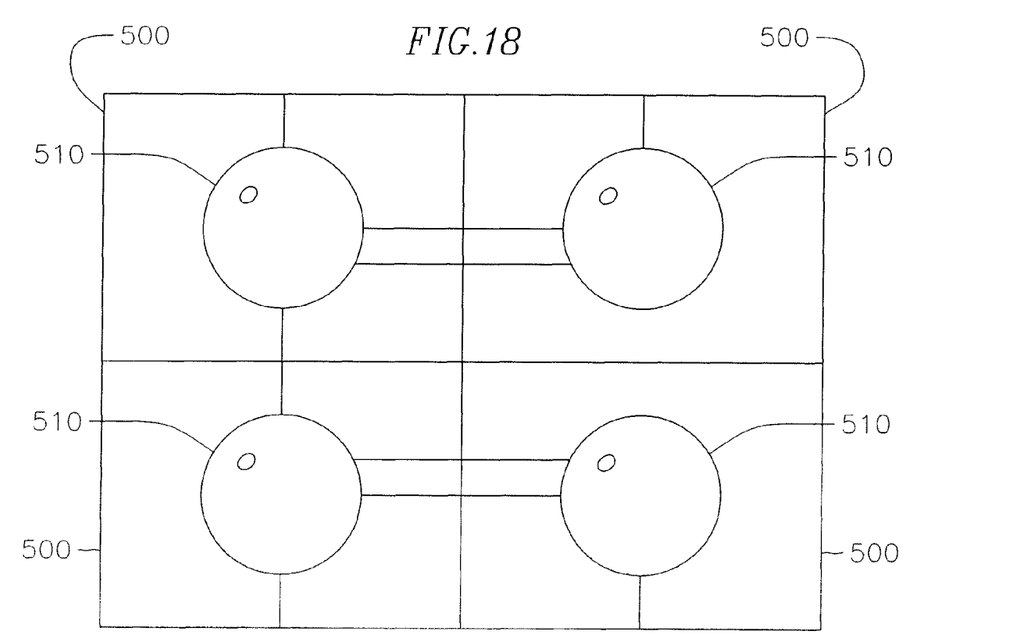
FIG. 18 a top schematic view of four filter capsule brackets according to an embodiment of the present invention, the four filter capsule brackets interlocked and retaining four filter capsules.

Further, in use, a plurality of filter capsule brackets may be utilized to retain a plurality of filter capsules, such as in a manifolded configuration. For example, FIG. 18 shows four filter capsules 510 manifolded together and retained by four filter capsule brackets 500. The filter capsule brackets 500 may be any of the embodiments of a filter capsule bracket described above. A filter capsule bracket may be connected to another adjacent filter capsule bracket by moving a second, third, or fourth side having a perimeter plug toward a second, third, or fourth side of the adjacent filter capsule bracket having a perimeter socket until the perimeter plug is received by the perimeter socket. This task may be repeated as many times as desired in order to connect (or manifold) a desired number of filter capsules.

Although the drawings illustrate the invention as applied to filter capsules for filtering liquids and biologicals, it will be apparent that the novel aspects of the interlocking brackets of the invention may also be utilized in retaining other objects in a similar manner (e.g., having a permanent orientation and predetermined relative spacing from each other).

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. A capsule bracket comprising:
    a first bracket portion comprising a first side having a concave surface and at least one plug; and
    a second bracket portion comprising a first surface opposite a second surface and a first side there-between having a concave surface intersecting said first and second surfaces and corresponding to the concave surface of the first bracket portion and at least one socket for receiving the at least one plug of the first side of the first bracket, wherein the socket is defined and sandwiched between the first and second surfaces,
    wherein the concave surfaces of the first and second bracket portions are configured to retain a capsule when the at least one plug of the first side of the first bracket portion is received by the at least one socket of the first side of the second bracket portion.

2. The capsule bracket of claim 1 wherein the at least one socket of the first side of the second bracket portion is configured to receive the at least one plug of the first side of the first bracket portion in a permanent interlocking manner.

3. The capsule bracket of claim 1 wherein the concave surface of at least one of the first and second bracket portions comprises a rib configured to be received in a groove on an outer surface of the capsule.

4. The capsule bracket of claim 1 wherein the concave surfaces of the first and second bracket portions are substantially semi-circular.

5. The capsule bracket of claim 1 wherein the at least one plug comprises a first tab, and the at least one socket comprises a first slot for receiving the first tab.

6. The capsule of claim 5 wherein the tab comprises an angled face.

7. The capsule bracket of claim 5 wherein the at least one plug further comprises a second tab, and the at least one socket further comprises a second slot for receiving the second tab.

8. The capsule of claim 7 wherein the second tab comprises a second angled face.

9. A pair of interlocking brackets configured to retain two filter capsules in a predetermined position relative to each other, each of the interlocking brackets comprising: a first bracket portion comprising a first side having a concave surface and a plug; and a second bracket portion comprising a first surface opposite a second surface and a first side there-between having a concave surface intersecting said first and second surfaces and a socket for receiving the plug of the first side of the first bracket, wherein the socket is defined and sandwiched between the first and second surfaces, wherein the concave surfaces of the first and second bracket portions configured to retain a filter capsule when the plug of the first side of the first bracket portion is received by the socket of the first side of the second bracket portion, wherein one of the interlocking brackets comprises a perimeter plug on another side of one of the bracket portions of the one interlocking bracket, and the other of the interlocking brackets comprises a perimeter socket on another side of one of the bracket portions of the other interlocking bracket, the perimeter socket configured to receive the perimeter plug of the one interlocking bracket.

10. A system of manifolded filter capsules, the system comprising a plurality of interlocking brackets for retaining a plurality of filter capsules, each of the plurality of interlocking brackets comprising:
    a first bracket portion comprising a first surface opposite a second surface and a first side there-between having a concave surface intersecting said first and second surfaces and a plug; a second side having a perimeter plug; a third side opposite the first side and having a perimeter socket; and a fourth side opposite the second side and having a perimeter socket; and
    a second bracket portion comprising first surface opposite a second surface and a first side there-between having a concave surface intersecting said second bracket first and second surfaces and a socket for receiving the plug of the first side of the first bracket; a second side having a perimeter plug; a third side opposite the first side and having a perimeter plug; and a fourth side opposite the second side and having a perimeter socket,
    wherein the concave surfaces of the first and second bracket portions are clamped on and retain a filter capsule when the plug of the first side of the first bracket portion is received by the socket of the first side of the second bracket portion, and
    wherein each of the perimeter sockets is defined between and is sandwiched by the first and second surfaces of its corresponding bracket and is configured to receive a perimeter plug of another of the plurality of interlocking brackets.

11. The system of claim 10 wherein each bracket portion comprises a rib extending along a circumferential direction from said concave surface of said bracket portion.

12. The system of claim 11 wherein said rib of each bracket portion is received on groove formed on a filter capsule of said plurality of filter capsules.

13. A capsule bracket comprising:
    a first bracket portion comprising,
        a first side comprising a concave surface, a first plug and a first socket,
        a second side opposite the first side comprising a second plug and a second socket,
        a third side between the first and second sides comprising a third plug, and
        a fourth side between the first and second sides and opposite the third side and comprising a third socket; and
    a second bracket portion comprising,
        a first side comprising a concave surface, a first plug and a first socket,
        a second side opposite the first side comprising a second plug and a second socket,
        a third side between the first and second sides comprising a third plug, and
        a fourth side between the first and second sides and opposite the third side comprising a third socket;
        wherein the second bracket portion is identical to the first bracket portion and wherein the first plug of the first bracket portion is snapped in the first socket of the second bracket portion and the first plug of the second bracket portion is snapped in the first socket of the first bracket portion for coupling the first and second bracket portions together to define said bracket, wherein the concave surfaces of the first and second bracket portions are configured to retain a capsule when said first a second bracket portions are coupled together.

14. The bracket of claim 13 further comprising a rib extending along a circumferential direction from the concave surface of each bracket portion.

15. A bracket system for supporting multiple capsules, wherein each of said capsules is supported by a bracket formed from identical bracket portions, wherein each bracket is connected to another bracket, wherein each bracket portion comprises:
   a first side comprising a concave surface, a first plug and a first socket;
   a second side opposite the first side comprising a second plug and a second socket;
   a third side between the first and second sides comprising a third plug; and
   a fourth side between the first and second sides and opposite the third side comprising a third socket, wherein a first plug of a first bracket portion is snapped in a first socket of a second bracket portion and a first plug of a second bracket portion is receivable within a first socket of the first bracket portion to define a bracket for supporting a capsule between the concave surfaces of said first and second bracket portions, wherein a second plug of a second side of the first bracket portion is snapped in a second socket of a second side of a third bracket portion and a second plug of the second side of the third bracket portion is snapped in a second socket of a second side of the second bracket portion, wherein a third plug of a third side of the first bracket portion is snapped in a third socket on a fourth side of a third bracket portion, and wherein a third plug on a fourth side of a fourth bracket portion is snapped in a third socket on a fourth side of the first bracket portion.

16. The bracket system as recited in claim 15 wherein each plug comprises a tab extending transversely from the plug and wherein each socket comprises a slot for receiving said tab for interconnecting said plug to said socket.

17. The bracket system as recited in claim 16 wherein each plug comprises another tab extending transversely from said plug an opposite said tab, and wherein each socket comprises another slot opposite said slot for receiving said another tab for interconnecting said plug to said socket.

18. The bracket system as recited in claim 15 wherein each bracket portion further comprises a rib extending along said concave surface.

19. A bracket portion for supporting a capsule comprising:
   a first surface opposite a second surface;
   a first side extending between the first and second surfaces and comprising a concave surface intersecting said first and second concave surfaces, a first plug and a first socket;
   a second side opposite the first side and extending between the first and second surfaces and comprising a second plug and a second socket;
   a third side between the first and second sides comprising a third plug; and
   a fourth side between the first and second sides and opposite the third side and extending between the first and second surfaces and comprising a third socket, wherein said bracket portion is coupleable with another bracket portion for forming a bracket for supporting said capsule with said concave surface, wherein each socket is defined and sandwiched between its corresponding first and second surfaces.

20. The bracket portion as recited in claim 19 further comprising a rib extending in a circumferential direction along said concave surface.

21. A capsule bracket comprising:
   a first bracket portion comprising a first side having a concave surface and at least one plug; and
   a second bracket portion comprising a first side having a concave surface corresponding to the concave surface of the first bracket portion and at least one socket for receiving the at least one plug of the first side of the first bracket,
   wherein the concave surfaces of the first and second bracket portions are configured to retain a capsule when the at least one plug of the first side of the first bracket portion is received by the at least one socket of the first side of the second bracket portion, wherein the at least one plug comprises a first tab, and the at least one socket comprises a first slot for receiving the first tab, and wherein the tab comprises an angled face.

22. The capsule bracket of claim 21 wherein the at least one plug further comprises a second tab, and the at least one socket further comprises a second slot for receiving the second tab.

23. The capsule of claim 22 wherein the second tab comprises a second angled face.

24. A bracket portion for supporting a capsule comprising:
   a first side comprising a concave surface, a first plug and a first socket;
   a second side opposite the first side comprising a second plug and a second socket;
   a third side between the first and second sides comprising a third plug;
   a fourth side between the first and second sides and opposite the third and comprising a third socket, wherein said bracket portion is coupleable with another bracket portion for forming a bracket for supporting said capsule with said concave surface; and
   a rib extending in a circumferential direction along said concave surface.

* * * * *

UNITED STATES PATENT AND TRADEMARK OFFICE
CERTIFICATE OF CORRECTION

| | | |
|---|---|---|
| PATENT NO. | : 7,905,457 B2 | Page 1 of 1 |
| APPLICATION NO. | : 12/419856 | |
| DATED | : March 15, 2011 | |
| INVENTOR(S) | : Christopher A. Meissner et al. | |

It is certified that error appears in the above-identified patent and that said Letters Patent is hereby corrected as shown below:

In the Claims

Column 12, Claim 10, line 21    Before "first" Insert -- a --

Column 13, Claim 13, line 7    Delete "a" Insert -- and --

Column 13, Claim 17, line 49    Delete "an"

Signed and Sealed this
Eighth Day of November, 2011

David J. Kappos
*Director of the United States Patent and Trademark Office*